United States Patent [19]

Macconochie et al.

[11] Patent Number: 4,738,583

[45] Date of Patent: Apr. 19, 1988

[54] SPACE SPIDER CRANE

[75] Inventors: Ian O. Macconochie, Yorktown; Martin M. Mikulas, Jr., Poquoson; Jack E. Pennington, Yorktown; Rebecca L. Kinkead, Christiansburg; Charles F. Bryan, Jr., Poquoson, all of Va.

[73] Assignee: The United States of America as represented by the Administrator of the National Aeronautics and Space Administration, Washington, D.C.

[21] Appl. No.: 913,432

[22] Filed: Sep. 30, 1986

[51] Int. Cl.$^4$ .................................................. B66C 3/00
[52] U.S. Cl. ...................................... 414/735; 414/750; 901/1; 901/33; 180/8.6
[58] Field of Search .................. 901/1, 50, 33, 34, 39; 180/8.1, 8.6; 414/749, 750, 751, 735

[56] References Cited

U.S. PATENT DOCUMENTS

| | | | |
|---|---|---|---|
| 2,918,738 | 12/1959 | Barr | 180/8.6 X |
| 3,612,201 | 10/1971 | Smith | 180/8.6 |
| 3,648,408 | 3/1972 | Terzian et al. | 46/244 D |
| 4,051,623 | 10/1977 | Ogawa | 46/103 |
| 4,201,937 | 5/1980 | Irie | 318/568 |
| 4,219,847 | 8/1980 | Pinkney et al. | 358/126 |
| 4,311,556 | 1/1982 | Iwamoto et al. | 376/249 |
| 4,333,259 | 6/1982 | Pin-Huang | 180/8.6 X |
| 4,349,837 | 9/1982 | Hinds | 358/93 |
| 4,409,718 | 10/1983 | Pryor | 29/407 |
| 4,511,011 | 4/1985 | Bartholet | 180/8.6 |
| 4,517,652 | 5/1985 | Bennett et al. | 364/513 |
| 4,527,650 | 7/1985 | Bartholet | 180/8.6 |
| 4,545,722 | 10/1985 | Cutkosky et al. | 414/730 |
| 4,558,758 | 12/1985 | Littman et al. | 901/1 X |
| 4,565,487 | 1/1986 | Kroczynski | 901/1 X |
| 4,585,388 | 4/1986 | Gossain et al. | 901/1 X |
| 4,637,494 | 1/1987 | Iida et al. | 414/750 X |

FOREIGN PATENT DOCUMENTS

| | | |
|---|---|---|
| 60-104474 | 6/1985 | Japan . |
| 515637 | 7/1976 | U.S.S.R. . |
| 1047680 | 10/1983 | U.S.S.R. . |
| 1074711 | 2/1984 | U.S.S.R. . |

OTHER PUBLICATIONS

Wagner-Bartak, "Future Applications of Remote Manipulators in Space", Canadian Aeronautics and Space Journal, 1981, pp. 17-25.
Hirose et al., "The Development of Soft Gripper for the Versatile Robot Hand", Tokyo Institute of Technology, pp. 353-360.
Deutsch et al., "Manipulator Systems Extend Man's Capabilities in Space", Astronautics and Aeronautics, 6-1972, pp. 30-40.
Klein et al., "Computer Coordination of Limb Motion for Locomotion of a Multiple-Armed Robot for Space Assembly", IEEE, 11-1982, pp. 913-919.
Slysh, "Automated Space Structures Assembly", General Dynamics Data Systems Division, pp. 1-7.
Heer, "Robots and Manipulators", Mechanical Engineering, 11-1981, pp. 42-49.
Hemami et al., "Biped Sway in the Frontal Plane with Locked Knees", IEEE, 7-1982, pp. 577-582.

*Primary Examiner*—L. J. Paperner
*Assistant Examiner*—Jennifer Doyle
*Attorney, Agent, or Firm*—George F. Helfrich; John R. Manning; Robert D. Marchant

[57] ABSTRACT

A space spider crane 15 is provided for the movement, placement, and/or assembly of various components on or in the vicinity of a space structure 120. Space spider crane 15 is comprised of a small central body 16 to which manipulators 24 and legs 25 are attached. The legs 25 are equipped with constant pressure gripping end effectors 29 to safely grip space structure 120. Walking by legs 25 or repairing and placing by the manipulators 24 may be controlled either by computer software 140 or a remotely situated human operator 135, who maintains visual contact with the space spider crane via television cameras 22 located at strategic positions on space spider crane 15. One possible walking program consists of a parallel motion walking program that results in small central body 16 alternatively leaning forward and backward relative to end effectors 29.

11 Claims, 6 Drawing Sheets

SPACE SPIDER CRANE

ORIGIN OF THE INVENTION

The invention described herein was made jointly in the performance of work under NASA Contract No. NAS1-17230 with Hew-Es-Co, Inc. and employees of the U.S. Government. In accordance with 35 USC 202, the contractor elected not to take title.

TECHNICAL FIELD OF THE INVENTION

This invention relates to the field of space robotics and more particularly to a space spider crane.

BACKGROUND OF THE INVENTION

As permanent space structures are utilized by the space program, a means for moving, placing, and/or assembling various components on or in the vicinity of the space structure will be required. Movement in three dimensions will be necessary to provide access to the desired work place. Prior proposals include the Remote Manipulator System (RMS) of the Space Shuttle, mobile manipulators such as the Mobile Remote Manipulator System (MRMS), and free flyers such as the Orbital Maneuvering Vehicle (OMV). The RMS consists of a manipulator, or mechanical arm, mounted on the Space Shuttle. Since the manipulator can move only in well defined zones relative to the Shuttle, and because the large physical size of the Shuttle limits accessibility, the effectiveness of the RMS around an irregularly shaped space structure would be limited. The mobile manipulators such as the MRMS, on the other hand, may translate along the nodes of a space structure. However, curved structural surfaces or irregular geometric structures would be difficult for the mobile manipulators to translate. The OMV is a self-propelled actuator equipped with manipulators to perform various repair tasks in space. Like the RMS, the manipulators of the OMV can move only in well defined zones relative to the body of the OMV, thereby limiting effectiveness around an irregularly shaped space structure.

Accordingly, it is an object of this invention to provide a means for the movement, placement, and/or assembly of various components on or in the vicinity of various space structures.

It is a further object of this invention to maximize accessibility to the work place by using a walking motion to accomplish translational motion on the space structure involving simplified software programming.

It is a further object of this invention to accomplish this walking motion without structural damage from high contact pressure to the lightweight space structure.

Other objects and advantages of this invention will become apparent hereinafter in the specification and drawing which follow.

SUMMARY OF THE INVENTION

According to the present invention, the foregoing and additional objects are achieved by providing a mobile, remotely commanded space spider crane with a small central body, long articulating legs with gripping end effectors, and manipulators (mechanical arms). The small central body houses rechargeable batteries and a distributed multi-computer control center for a high level of onboard autonomy. Routine, repetitive activities may be controlled by a computer located in the control center. More specialized activities may be radio controlled by a remotely situated human operator. The human operator maintains visual contact with the space spider crane via television cameras mounted on the central body and on appropriate positions on the legs and manipulators.

The legs are comprised of three main segments. A long leg is formed by connecting these segments end-to-end. Joints are located at each of two connections. The drives and mechanisms for these two joints are located within the connected segments. The upper end of the leg is connected to the lower half of the small central body at a hip joint. The lower end of the leg is characterized by an extendable ankle segment. The length of the legs and the controllable joints allow for quick translational and rotational walking on or around the space structure.

A gripping end effector is connected to the extendable ankle segment to allow the legs to grip the space structure. An upper jaw is connected to the extendable ankle segment. This upper jaw houses a motor, whose output shaft is connected to a lower jaw. These jaws are lined with a constant pressure pad comprising an elastic membrane filled with a viscous substance which has a nearly constant viscosity over temperatures ranging from 0° to 100° F. Pressure sensitive cells are also located within the elastic membrane to relay contact pressure to the position indicator of the motor which controls the gripping motion by rotating its output shaft. If necessary, heating elements may be embedded in the viscous substance to maintain a nearly constant viscosity over the wide range of space temperatures.

The manipulators are very simliar to the legs. Notably, the manipulators each have three segments, two joints, drives and mechanisms, and extendable wrist segments like the legs. Several distinctions, however, merit attention. First, the manipulator is attached to a shoulder joint at the upper, rather than lower, half of the small central body. The upper half of the central body rotates while the lower half and legs remain stationary, thereby resulting in a traditional crane motion. Second, the length of the manipulator segments is propoprtionally longer than their leg counterparts to achieve greater accessibility to work places. Third, the manipulators have interchangeable end effectors to achieve various tasks such as repair or assembly. The manipulators can be fitted with a gripping end effector to hold loads for movement or transportation. Also, the manipulators may be equipped with electrical outlets to provide power for electrical tools.

DETAILED DESCRIPTION OF THE INVENTION

Figure 1:
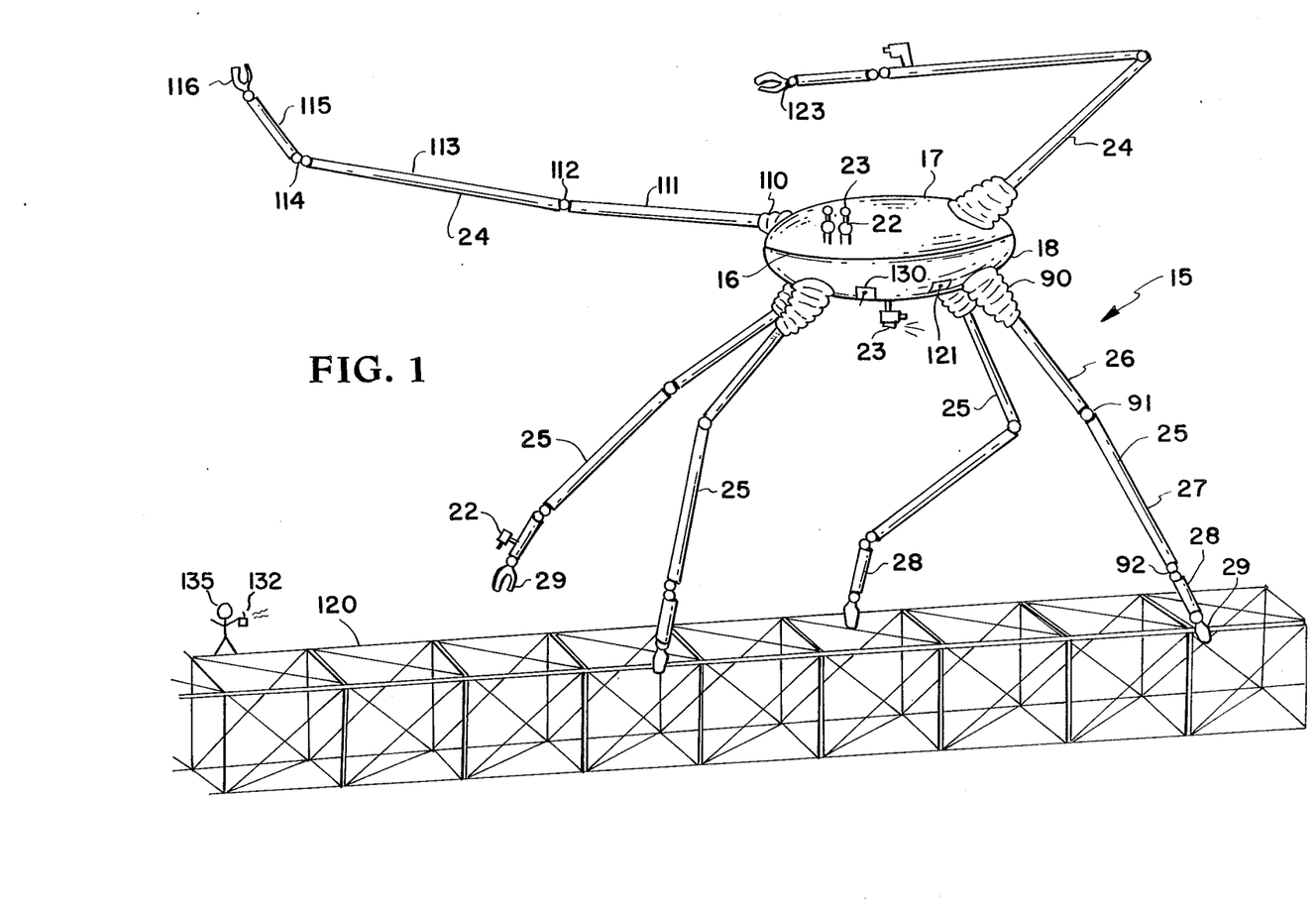
FIG. 1 is a pictorial view of the space spider crane of the present invention comprising the preferred embodiment of a small central body, four legs, and two manipulators.
Figure 6:
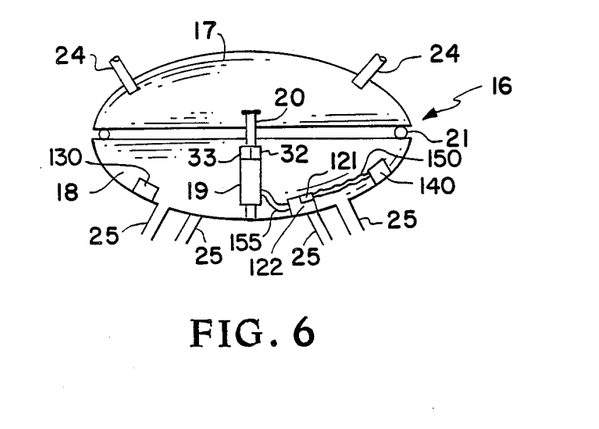
FIG. 6 is a side view of the small central body.

As illustrated in FIG. 1, the space spider crane 15 is comprised of a small central body 16 to which manipulators (mechanical arms) 24 and legs 25, equipped with gripping end effectors 29, are connected. Referring now to FIG. 6, electrical power for the various drive motors such as drive motor 19 is supplied by rechargeable electrical batteries 122. The rate and duration of each movement will be defined by on-board controller algorithms which are embodied in conventional computer software and are designed to produce reasonable performance without damage to the space structure 120. Computer 140 will execute these algorithms. The resulting electrical signal is transmitted from computer 140 via cables 150 to rheostats (not shown) connected to rechargeable batteries 122. These rheostats dictate the amount of voltage transmitted from the rechargeable batteries 122 along flexible cables 155 to the various drive motors. The magnitude and duration of this voltage controls the rotation of the drive shafts of the various drive motors. The batteries 122 will be recharged via electrical inlet 121 located on small central body 16 from the space station or some other external source of power. The small central body 16 is seen to be comprised of an upper body half 17, to which the manipulators 24 are connected, and a lower body half 18, to which the legs 25 are connected. Turret bearings 21 separate upper body half 17 from lower body half 18. Also, a drive motor 19 is fixed to lower body half 18. All drive motors such as this drive motor 19 has planetary gears 32 and position, rate, and torque sensors 33 attached to its initial drive shaft (not shown). One end of a main drive shaft 20 is attached to these planetary gears 32 and the other end of main drive shaft 20 is attached to upper body half 17. Thus, when legs 25 are held immobile in relation to lower body half 18 and drive motor 19 receives an appropriate voltage from a rechargeable battery 122 via cables 155, the upper body half 17 and manipulators 24 are rotated in a traditional crane motion.

Figure 2:
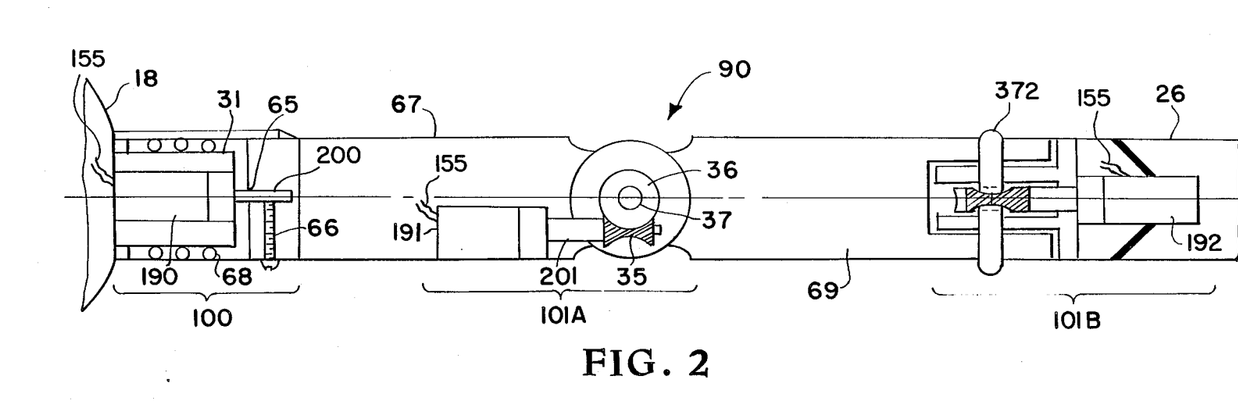
FIG. 2 is a view of the hip joint area of a leg, which corresponds to the shoulder joint area of a manipulator, comprising two pivot joints with rotational axes perpendicular both to the longitudinal axis of the segment and to each other, and one pivot joint with a rotational axis coincident with the longitudinal axis of the segment.

Referring back to FIG. 1, the legs 25 are seen to comprise a hip joint area 90, an upper leg segment 26, a knee joint area 91, a lower leg segment 27, an ankle joint area 92, an extendable ankle segment 28, and a gripping end effector 29. Referring now to FIG. 2, hip joint area 90 is seen to comprise one pivot joint 100 and two pivot joints, 101A and 101B. The pivot joint 100 is actuated by a drive motor 190, which is fixed to lower body half 18. A cylindrical enclosure 31 is also fixed to lower body half 18 and encloses drive motor 190. The main drive shaft 200 of drive motor 190 passes through aperture 65 of cylindrical enclosure 31 and comes into contact with the tail end of a shear pin 66. Shear pin 66 passes through rotating segment 67, which is a cylinder which encloses cylindrical enclosure 31. One end of rotating segment 67 abuts to lower body half 18 and the other end abuts to translational segment 69. Bearings 68 are located between the rotating segment 67 and cylindrical enclosure 31. Thus, when drive motor 190 receives an appropriate voltage from a rechargeable battery 122 via cables 155 activated, rotating segment 67 and subsequently attached members are rotated about the longitudinal axis of rotating segment 67.

A pivot joint 101A is actuated by a drive motor 191 which is fixed to an inner wall of rotating segment 67. A threaded worm 35 is fixed to the main drive shaft 201 of drive motor 191. Threaded worm 35 is in tangential contact with a like-threaded worm wheel 36. A pivot shaft 37 is passed through and is fixed to the center of worm wheel 36. Each end of pivot shaft 37 is fixed to translational segment 69, whose ends abut rotating segment 67 and upper leg segment 26. Thus, when drive motor 191 receives an appropriate voltage from a rechargeable battery 122, translational segment 69 and subsequently attached members are pivoted about an axis which is perpendicular to the longitudinal axis of rotating segment 67. A second pivot joint 101B has each end of its pivot shaft 372 fixed to translational segment 69 and its drive motor 192 fixed to one end of upper leg segment 26. Thus, when drive motor 192 receives an appropriate voltage from rechargeable battery 122 via cables 155, upper leg segment 26 and subsequently attached members are pivoted about an axis which is perpendicular to the longitudinal axis of rotating segment 67. Also, this second pivot joint 101B is oriented 90° to the first pivot joint 101A to achieve a pivotal motion which is perpendicular to the pivotal motion of the first pivot joint 101A.

Figure 3:
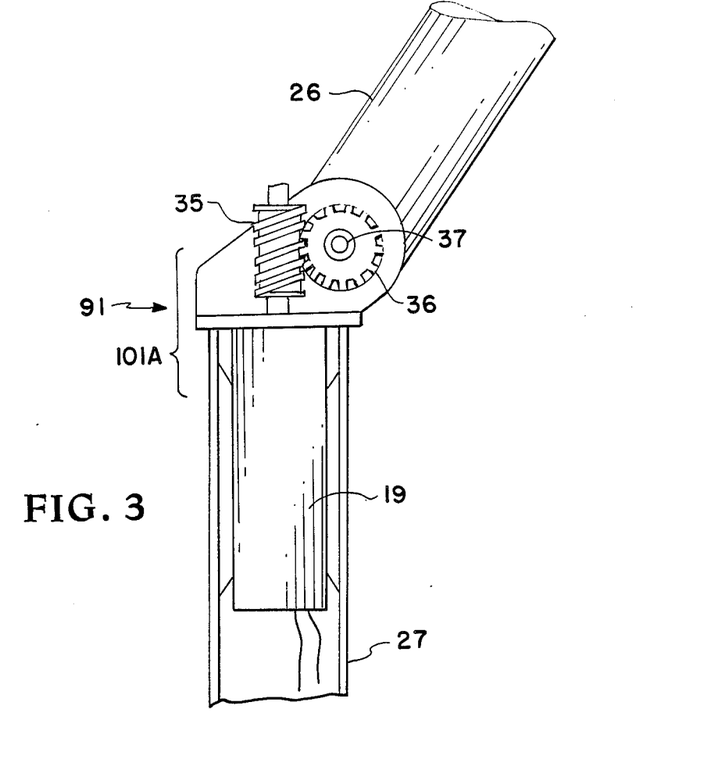
FIG. 3 is a side view of the knee pivot joint of a leg, which corresponds to the elbow pivot joint of a manipulator.

Referring now to FIG. 3, knee joint area 91 is seen to comprise a pivot joint 101C. Each end of pivot shaft 373 is connected to the distal end of upper leg segment 26. Pivot shaft 373 passes through and is fixed to the center of worm wheel 363. A threaded worm 353 is in tangential contact with like-threaded worm wheel 363. Threaded worm 353 is fixed to the main drive shaft 203 of drive motor 193. Drive motor 193 is fixed to an inner wall of an end of lower leg segment 27. Thus, when drive motor 193 receives an appropriate voltage from a rechargeable battery 122 via cables 155, lower leg segment 27 and subsequently attached members are pivoted about an axis coincident with the pivotal axis of pivotal joint 101A of hip area 90.

Figure 8:
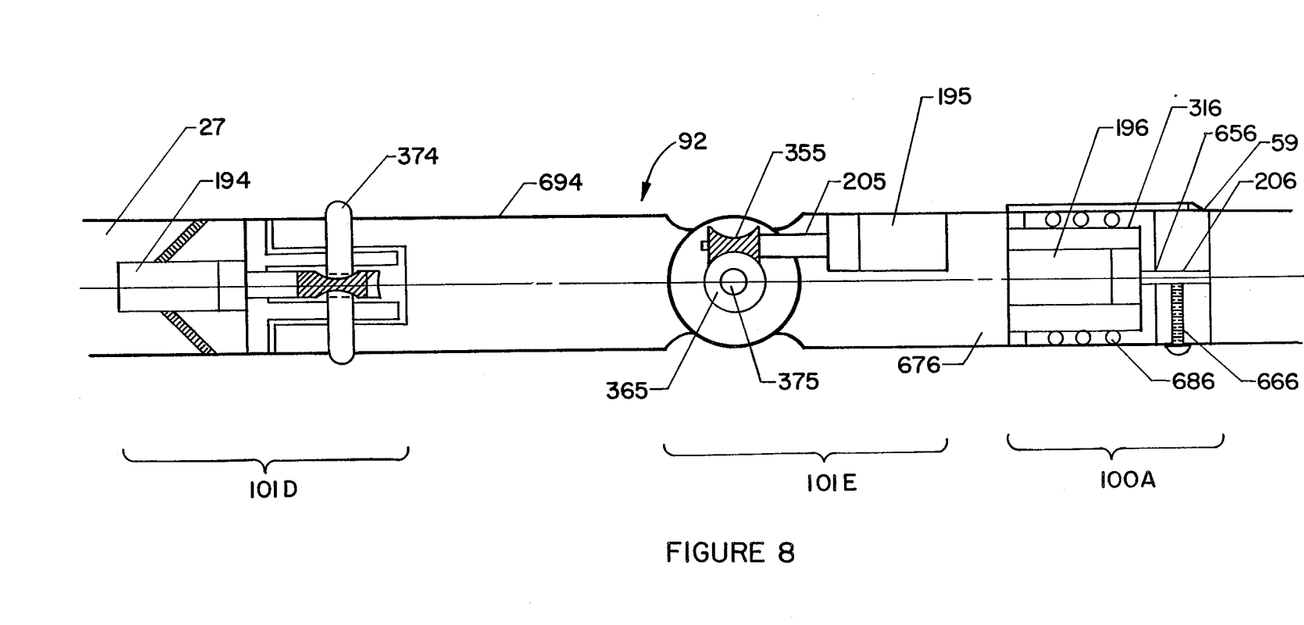
FIG. 8 is a view of the ankle joint area of a leg, which corresponds to the wrist joint area of a manipulator, comprising two pivot joints with rotational axes perpendicular both to the longitudinal axis of the segment and to each other, and one pivot joint with a rotational axis coincident with the longitudinal axis of the segment.

Referring back to FIG. 1, lower leg segment 27 is connected to ankle joint area 92. Referring now to FIG. 8, ankle joint area 92 is an approximate inversion of hip joint area 90 (see FIG. 2 and discusison above). The drive motor 194 of a pivot joint 101D of ankle joint area 92 is fixed to an inner wall of the distal end of lower leg segment 27 (See FIG. 3 and discussion above). The pivot shaft 374 of pivot joint 101D is fixed to translational segment 694, whose ends abut translational segment 676 and the distal end of lower leg segment 27. Thus, when motor 194 receives an appropriate voltage from a rechargeable battery 122 via cables 155, translational segment 694 and subsequently attached members are pivoted about an axis which is perpendicular to the longitudinal axis of lower leg segment 27. A pivot joint 101E has a drive motor 195 attached to the inner wall of translational segment 676. A threaded worm 355 is fixed to the main drive shaft 205 of drive motor 195. Threaded worm 355 is in tangential contact with a like-threaded worm wheel 365. A pivot shaft 375 is passed through an is fixed to the center of worm wheel 365. Each end of pivot shaft 375 is fixed to translational segment 694. Thus, when drive motor 195 receives an appropriate voltage from a rechargeable battery 122 via cables 155, translational segment 676 and subsequently attached members are pivoted about an axis which is perpendicular to the longitudinal axis of translational segment 694. Pivot point 100A is actuated by a drive motor 196 which is fixed to translational segment 676. A cylindrical enclosure 316 is also fixed to translational segment 676 and encloses drive motor 196. The main drive shaft 206 of drive motor 196 passes through aperture 656 of cylindrical enclosure 316 and comes into contact with the tail end of a shear pin 666. Shear pin 666 passes through non-extending ankle segment 59. Bearings 68 are located between the rotating segment 67 and cylindrical enclosure 31. Thus, when drive motor 196 receives an appropriate voltage from a rechargeable battery 122 via cables 155, non-extending ankle segment 59 and subsequently attached members are rotated about the longitudinal axis of non-extending ankle segment 59.

Figure 4:
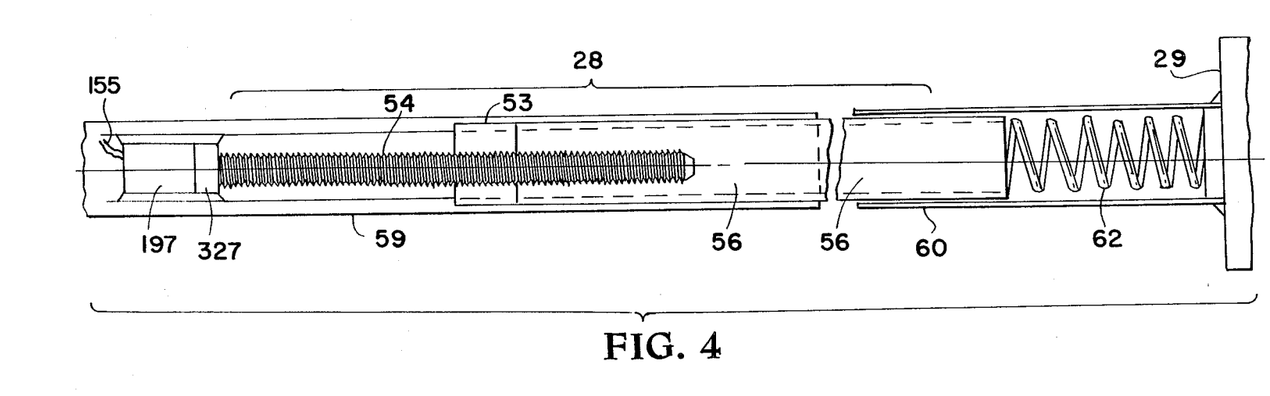
FIG. 4 is a top view of the wrist assembly comprising an extender, a shock absorber assembly, and a gripping end effector.

Referring now to FIG. 4, an extendable ankle segment 28 comprising non-extending ankle segment 59 and extending ankle segment 60 is shown. A drive motor 197 is fixed to the inner walls of non-extending ankle segment 59. A threaded screw jack drive 54 is fixed to the planetary gears 327 of drive motor 197. Screw jack drive 54 is received by threaded drive bushing 53, which is fixed to one end of extending spline shaft 56. The other end of extending spline shaft 56 has one end of shock absorber spring 62 attached to itself. The other end of shock absorber spring 62 is fixed to end effector 29. Extending ankle segment 60 is also fixed to end effector 29 and encloses shock absorber spring 62 and a position of extending spline shaft 56. Extending spline shaft 56 is externally splined and non-extending ankle segment 59 and extending ankle segment 60 are internally splined. Thus, when drive motor 197 receives an appropriate voltage from a rechargeable battery 122 via cables 155, axial motion of extending spline shaft 56 and subsequently attached member (e.g., extending ankle segment 60 and end effector 29) relative to non-extending ankle segment 59 is accomplished and rotational motion prevented. If an axial force is applied to end effector 29 (e.g., end effector 29 comes into contact with an object), shock absorber spring 62 contracts axially moving extending ankle segment 60 relative to extending spline shaft 56.

Figure 5:
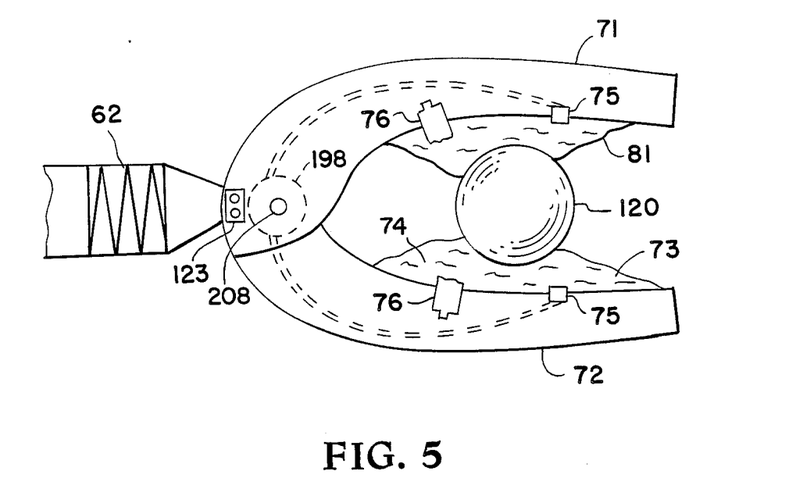
FIG. 5 is a side exposed view of the preferred embodiment of the gripping end effector of FIG. 4.
Figure 5A:
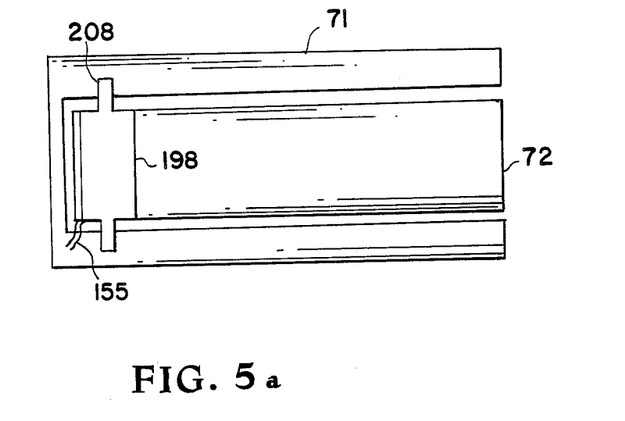
FIG. 5A is a top view of the preferred embodiment of the gripping end effector of FIG. 5.

Referring now to FIG. 5, a gripping end effector 29 comprising upper jaw 71 and lower jaw 72, each equipped with a constant pressure pad 81, is shown. Constant pressure pad 81 is comprised of an elastic membrane 73 which is fixed to a jaw. Elastic membrane 73 encloses a viscous substance 74 which has a relatively constant viscosity over a range of temperatures from 0° F. to 100° F. Heating elements 76 may also be placed in viscous substance 74 to maintain a constant temperature, and therefore viscosity, of viscous substance 74 if lower temperatures are encountered. Pressure sensitive cells 75 are placed in viscous substance 74 and transmit the pressure exerted by constant pressure pad 81 to a drive motor 19. Referring now to FIG. 5a, drive motor 198 is fixed to upper jaw 71. Drive motor 19 has main drive shaft 208 which is fixed to lower jaw 72. Thus, when drive motor 198 receives an appropriate voltage from a rechargeable battery 122 via cables 155, a constant pressure gripping motion of end effector 29 is achieved which avoids structural damage to the space structure 120.

Referring back to FIG. 1, the manipulators 24 are seen to comprise a shoulder joint area 110, an upper arm segment 111, an elbow joint area 112, a forearm segment 113, a wrist joint area 114, an extendable wrist segment 115, and interchangeable end effector 116. Shoulder joint area 110, elbow joint area 112, and wrist joint area 114 of manipulator 24 correspond to the hip joint area 90, knee joint area 91, and ankle joint area 92, respectively, of leg 25 (see FIGS. 2, 3, 4 and 8 and discussion above). Upper arm segment 111 and forearm segment 113 correspond to and are approximately 25% longer than upper leg segment 26 and lower leg segment 27, respectively. This 25% increase in length allows for maximum accessibility of manipulators 24 to the work place. Interchangeable end effectors 116 are attached to the extendable wrist segment 115. These interchangeable end effectors 116 are interchangeable to allow for various functions to be performed (e.g., assembling, repair, etc.). If a gripping function is desired to achieve transportation, the selected interchangeable end effector 116 can be a gripping end effector 29 (see FIG. 5 and discussion above). Referring to FIG. 5, if work requiring electric power tools is required, power may be supplied from electrical outlet 123 located on upper jaw 71.

Referring now to FIGS. 1 and 6, space spider crane 15 may be controlled by either a human operator 135 and/or by the on-board computer 140 with appropriate software. A remotely located human operator 135 can control the space spider crane 15 by relaying radio commands via a radio transmitter 132 to a radio receiver 130 located in small central body 16. These radio commands may be translated by appropriate software executing the on-board computer 140. Pre-programmed software may be employed to control certain repetitive tasks such as construction, cargo transport, etc. Factors to be considered in both methods of control include both the structural characteristics of space structure 120 and the physical attributes of the cargo to be transported or task to be performed. Accordingly, computer 140 may control the movements of the space spider crane 15 as discussed previously.

Swivelling and hinged television cameras 22 are located at appropriate places on small central body 16, manipulators 29, and legs 25 to provide the human operator with maximum visual contact with the space spider crane 15 and the work place. These television cameras 22 may be located in pairs to provide stereo imaging. Floodlights 23 may also be located near the television cameras 22 to provide adequate lighting.

Functions such as walking and repair which must be repeatedly performed can be controlled by computer software of computer 140 located in small central body 16. Since simple motions are easier to program and the space spider crane 15 will be operating in the absence of gravity, walking while transporting a heavy load may be accomplished by a series motions in which the space spider crane alternately leans forwards and backwards.

Figure 7:
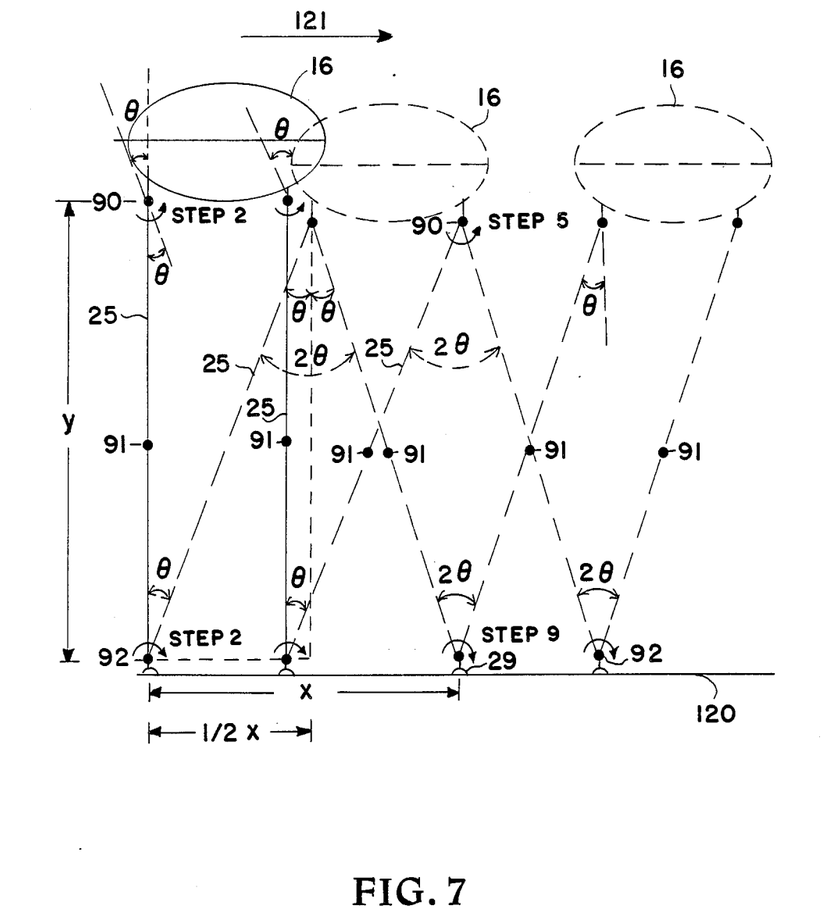
FIG. 7 is a representation of the walking program for the space spider crane.

Referring to FIG. 7, this parallel motion walking program consists of the following:

(1) Space spider crane 15 is configured in an erect position, with legs 25 perpendicular to the space structure 120 and the directional arrow of walking 121. The four gripping end effectors 29 of legs 25 are gripping space structure 120. Knee joint areas 91 of legs 25 remain immobile throughout this translational walking program.

(2) A command is given for the pivot joints 101A of the hip joint areas 90 and the pivot joints 101A of the ankle joint areas 92 of the four legs 25 to simultaneously rotate through equal angles θ about an axis which is perpendicular to both the directional arrow of walking 121 and the longitudinal axis of each erect leg 25 (i.e., an axis extending out of the page in FIG. 7). The hip joint areas 90 rotate counterclockwise and the ankle joint areas 92 rotate clockwise. This command results in small central body 16 leaning forward relative to end effectors 29 and remaining parallel to the directional arrow of walking 121.

(3) Next a command is given for gripping end effector 29 of lead leg 25 to ungrip space structure 120.

(4) Next a command is given for extendable ankle segment 28 of lead leg 25 to retract an appropriate distance to allow clearance between lead leg 25 and space structure 120 during rotation of lead leg 25.

(5) Next a command is given for pivot joint 101A of hip joint area 90 of lead leg 25 to rotate counterclockwise through an angle 2θ about an axis which is perpendicular both to the directional arrow of walking 121 and the longitudinal axis of extendable ankle segments 28 of the stationary legs 25 (i.e., an axis extending from the paper in FIG. 7). This command accomplishes the actual step of lead leg 25.

(6) Next a command is given for extendable ankle segment 28 of lead leg 25 to re-extend the appropriate distance to re-grip the space structure 120.

(7) Next a command is given for gripping end effector 29 of lead leg 25 to grip space structure 120.

(8) Repeat (3) through (8) for remaining legs 25, starting first with the other lead leg 25 and then with the remaining two legs 25. This rotation results in small central body 16 leaning backward relative to end effectors 29 and remaining parallel to the directional arrow of walking 121.

(9) Repeat (2) for an angle of 2θ. This repetition results in small central body 16 leaning forward relative to end effectors 29 and remaining parallel to directional arrow of walking 121.

(10) Repeat (4) through (9) as many times as required to achieve the desired distance.

It should be obvious to those skilled in the art that the determination of θ depends on the size of the steps desired. The following trigonometric relation shows this dependence:

$$x = 2y \sin \theta$$

where x is the size of the desired step and y is the length of leg 25 from pivot joint 101A of hip joint area 90 to pivot joint 101A of ankle joint area 92.

The size of the step may be dictated by the spacing between nodes on space structure 120 or other factors.

What is claimed as new and desired to be secured by Letters Patent of the United States is:

1. A space spider crane comprising:
   n legs, comprising a proximal segment with proximal and distal ends and a distal segment with proximal and distal ends which are connected distal end-to-proximal end by an independent knee pivot joint, an independent hip joint located at the proximal end of said proximal segment, and an extendable ankle segment connected to the distal end of said distal segment by an independent ankle joint;
   a manipulator comprising a proximal segment with proximal and distal ends and a distal segment with proximal and distal ends which are connected distal end-to-proximal end by an independent elbow pivot joint, an independent shoulder joint located at the distal end of said proximal segment, and an extendable wrist segment with a distal end and a proximal end which is connected to the distal end of said distal segment by an independent wrist joint at the proximal end of said wrist segment;
   n gripping end effectors which are each connected to said n extendable ankle segments to grip a space structure;
   a central body comprising a rotating upper half to which said shoulder joint is connected and a bottom half to which siad n hip joints are connected;
   a means of control for said n legs and said gripping end effectors to accomplish walking in zero gravity;
   a means of control for said manipulator;
   a power source for said legs, manipulators, gripping end effectors, central body, and means of control.

2. The space spider crane of claim 1 wherein said manipulator has a gripping end effector attached to the distal end of said extendable wrist segment.

3. The space spider crane of claim 2 wherein each gripping end effector comprises:
   jaws with controllable gripping motion;
   a constant pressure pad lining for said jaws comprising an elastic membrane enclosing both a viscous substance and pressure sensitive cells to monitor contact pressure.

4. The space spider crane of claim 3 wherein said constant pressure pad lining contains heating elements to maintain desired, nearly constant viscosity of the viscous substance in space temperatures ranging from 0° to 100° F.

5. The space spider crane of claim 1 wherein said manipulator has an interchangeable end effector attached to the distal end of said extendable wrist segment.

6. The space spider crane of claim 1 wherein n=4, to provide a stable, tripodal support when one leg is extended for walking.

7. The space spider crane of claim 6 wherein said means of control for said n legs and gripping end effectors includes a computer controlled parallel motion walking program, and is operable
   to rotate said n legs counterclockwise at the hip joints and clockwise at the ankle joints through an angle θ about axes perpendicular to the direction of walking and perpendicular to the respective longitudinal axis of each said leg;
   to advance each said leg individually by ungripping said gripping end effector from the space structure, rotating the said leg counterlockwise at the hip joint through an angle 2θ about an axis perpendicular to the direction of walking and perpendicular to the longitudinal axis of said leg, and regripping said gripping end effector to the space structure;
   to rotate said n legs counterclockwise at the hip joints and clockwise at the ankle joints through an angle 2θ about axes perpendicular to the direction of walking and perpendicular to the respective longitudinal axis of each said leg; and to repeat said advancing and said rotating through an angle $2\theta$ to accomplish a walking motion.

8. The space spider crane of claim 1 wherein said means of power is a rechargeable electric battery.

9. The space spider crane of claim 1 wherein said manipulator is approximately 25% longer than said legs to achieve maximum accessibility to a workplace.

10. The space spider crane of claim 1 wherein said means of control for said n legs and for said manipulator is a remote control system comprising:

a remotely situated radio transmitter;

a radio receiver located in said central body;

a means for actuating said drivers of said manipulator, legs, and end effectors in response to radio signals received by said radio receiver from said radio transmitter; and television cameras mounted on said legs, manipulator, and central body to allow visual contact by a remote operator of said remotely situated radio transmitter.

11. The space spider crane of claim 1 wherein said independent hip, ankle, shoulder, and wrist joints are each a three joint area comprising two pivot joints with rotational axes perpendicular both to the longitudinal axis of said connected segment and to each other, and one pivot joint with a rotatioal axis coincident with the longitudinal axis of said connected segment.

* * * * *